US012624694B2

(12) United States Patent
Sun et al.

(10) Patent No.: US 12,624,694 B2
(45) Date of Patent: May 12, 2026

(54) CONTROL METHOD FOR COMPRESSOR AND COMPRESSOR SYSTEM

(71) Applicant: Danfoss (Tianjin) Ltd., Tianjin (CN)

(72) Inventors: Yingke Sun, Nordborg (DK); Wanzhen Liu, Nordborg (DK); Qingyue Meng, Nordborg (DK); Li Yao, Nordborg (DK); Shizhong Ji, Nordborg (DK)

(73) Assignee: DANFOSS (TIANJIN) LTD., Tianjin (CN)

( * ) Notice: Subject to any disclaimer, the term of this patent is extended or adjusted under 35 U.S.C. 154(b) by 192 days.

(21) Appl. No.: 18/400,023

(22) Filed: Dec. 29, 2023

(65) Prior Publication Data

US 2024/0218878 A1 Jul. 4, 2024

(30) Foreign Application Priority Data

Dec. 30, 2022 (CN) .......................... 202211743093.8

(51) Int. Cl.
F04C 28/08 (2006.01)
F04C 28/28 (2006.01)
(Continued)

(52) U.S. Cl.
CPC .............. F04C 28/08 (2013.01); F04C 28/28 (2013.01); F04D 29/661 (2013.01); G01H 1/003 (2013.01);
(Continued)

(58) Field of Classification Search
CPC .... F04C 28/08; F04C 28/28; F04C 2270/051; F04C 2270/125; F04C 2270/86;
(Continued)

(56) References Cited

U.S. PATENT DOCUMENTS 5,975,854 A * 11/1999 Culp, III ............... F04C 23/008
417/18
6,302,654 B1 * 10/2001 Millet ................... F04C 23/008
417/310
(Continued)

FOREIGN PATENT DOCUMENTS

| CN | 107514839 A | * 12/2017 | ............. F25B 31/00 |
| CN | 110030683 A | * 7/2019 | ............. F24F 11/64 |
| CN | 112393394 A | * 2/2021 | ............. F24F 11/86 |

OTHER PUBLICATIONS

CN112393394 English Translation (Year: 2021); Yangyang.*

*Primary Examiner* — Jesse S Bogue
(74) *Attorney, Agent, or Firm* — McCormick, Paulding & Huber PLLC

(57) ABSTRACT

A control method includes: a detection step of: detecting a vibration amplitude of the compressor; a determination step of: determining whether the detected vibration amplitude of the compressor is greater than or equal to a predetermined threshold; and a speed adjustment step of changing a switching frequency of a frequency converter or/and modulate a frequency of the compressor if the detected vibration amplitude of the compressor is greater than or equal to the predetermined threshold. A compressor system is also provided by an embodiment. The control method and the compressor system make it convenient to know whether abnormal vibration of the compressor occurs, and can avoid the resonance frequency range.

19 Claims, 3 Drawing Sheets

(51) Int. Cl.
  *F04D 29/66* (2006.01)
  *G01H 1/00* (2006.01)

(52) U.S. Cl.
  CPC .. *F04C 2270/051* (2013.01); *F04C 2270/125* (2013.01); *F04C 2270/86* (2013.01)

(58) Field of Classification Search
  CPC ... F04C 18/0215; F04D 29/661; G01H 1/003; F04B 49/20; F04B 51/00
  See application file for complete search history.

(56) References Cited

U.S. PATENT DOCUMENTS

| | | | | |
|---|---|---|---|---|
| 11,287,156 | B2 * | 3/2022 | Zhuo ...................... | G05B 15/02 |
| 11,619,224 | B2 * | 4/2023 | Nakamura .............. | F04B 49/10 |
| | | | | 702/183 |
| 11,692,542 | B2 * | 7/2023 | Stark ...................... | F04B 49/10 |
| | | | | 415/118 |
| 2004/0031283 | A1 * | 2/2004 | Ahn ................... | F04B 39/0044 |
| | | | | 62/503 |
| 2014/0212266 | A1 * | 7/2014 | Lee ...................... | F04D 27/004 |
| | | | | 415/119 |
| 2015/0051742 | A1 * | 2/2015 | Caillat ................... | F04B 49/10 |
| | | | | 700/282 |
| 2016/0282026 | A1 * | 9/2016 | Park ...................... | G05B 15/02 |
| 2024/0384773 | A1 * | 11/2024 | Tang ...................... | G05D 19/02 |

\* cited by examiner

S100 — Detecting a vibration amplitude of a compressor

S200 — Determining whether the detected vibration amplitude of the compressor is greater than or equal to a predetermined threshold No Yes S300 — Changing a switching frequency of a frequency converter or/and modulating a frequency of the compressor

CONTROL METHOD FOR COMPRESSOR AND COMPRESSOR SYSTEM

CROSS-REFERENCE TO RELATED APPLICATION

This application claims foreign priority benefits under 35 U.S.C. § 119 from Chinese Patent Application No. 202211743093.8, filed Dec. 30, 2022, the content of which is hereby incorporated by reference in its entirety.

TECHNICAL FIELD

Embodiments of the present disclosure relate to a control method for a compressor and a compressor system.

BACKGROUND

Compressors will have abnormal vibration phenomena (caused by resonance) at different mechanical rotation speeds due to different quality, different installation ways, and different fixing manners of the compressors. When mechanical components such as compressor bearings, scrolls, and suction and discharge ports are worn out, the abnormal vibration of the compressor also occurs. These abnormal vibrations will aggravate the damage of the mechanical components of the compressor and generate noise.

Currently, before the compressor and frequency converter leave the factory, several sets of resonance frequency points are preset in the frequency converter. No matter what environment in the field the compressor is installed, frequency hopping is performed according to the preset frequency hopping points to avoid these preset resonance points. When the mechanical components of the compressor are worn out, there is currently no subsequent processing for hopping points.

After leaving the factory, the compressor will be installed and fixed on any different occasions and foundations by a customer, and pipelines rigidly connected to the compressor are also different. These factors will cause change in the natural frequency of the compressor, which will cause change in the resonance point. If the frequency hopping is performed according to the preset frequency hopping points, some smooth frequency points will be directly skipped, and the compressor will still operate for a long time at some frequency points with large vibrations, thereby aggravating the damage of the mechanical components of the compressor.

SUMMARY

An embodiment of the present disclosure is to provide a control method for a compressor, whereby, for example, it is convenient to know whether abnormal vibration of the compressor occurs, and the resonance frequency range of the compressor may be avoided and the service life of the compressor may be extended by changing switching frequency of a frequency converter or modulating the frequency of the compressor.

According to an embodiment of the present disclosure, there is provided a control method for a compressor, including: a detection step of: detecting a vibration amplitude of the compressor; a determination step of: determining whether the detected vibration amplitude of the compressor is greater than or equal to a predetermined threshold; and a speed adjustment step of: changing a switching frequency of a frequency converter or/and modulating a frequency of the compressor if the detected vibration amplitude of the compressor is greater than or equal to the predetermined threshold.

According to an embodiment of the present disclosure, the compressor includes: a shell having a lower part; and a refrigerant discharge pipe connected to the shell, wherein the detection step includes: detecting the vibration amplitude of the lower part of the shell of the compressor in a horizontal direction and perpendicular to an axial direction of the refrigerant discharge pipe.

According to an embodiment of the present disclosure, the compressor includes: a shell having a lower part; and a refrigerant discharge pipe connected to the shell; wherein the detection step includes: detecting at least one of a first vibration amplitude in a first direction, a second vibration amplitude in a second direction, and a third vibration amplitude in a third direction of the lower part of the shell of the compressor; wherein the first direction is an axial direction of the refrigerant discharge pipe, the second direction is perpendicular to the first direction, and the third direction is perpendicular to the first and second directions.

According to an embodiment of the present disclosure, the refrigerant discharge pipe extends in a horizontal direction, and the first and second directions defines a horizontal plane.

According to an embodiment of the present disclosure, the lower part of the shell of the compressor is provided with a vibration sensor.

According to an embodiment of the present disclosure, the determination step includes: determining whether each of the first vibration amplitude, the second vibration amplitude, and the third vibration amplitude is greater than or equal to the predetermined threshold; and the speed adjustment step includes: if the second vibration amplitude is greater than or equal to the predetermined threshold, and the first and third vibration amplitudes are less than a first threshold, modulating the frequency of the compressor by the frequency converter.

According to an embodiment of the present disclosure, the determination step includes: determining whether at least one of the first vibration amplitude, the second vibration amplitude, and the third vibration amplitude is greater than or equal to the predetermined threshold; and the speed adjustment step includes: if the at least one of the first vibration amplitude, the second vibration amplitude, and the third vibration amplitude is greater than or equal to the predetermined threshold, and the compressor is in an acceleration or deceleration stage, modulating the frequency of the compressor by the frequency converter.

According to an embodiment of the present disclosure, the determination step includes: determining whether each of the first vibration amplitude, the second vibration amplitude, and the third vibration amplitude is greater than or equal to the predetermined threshold; and the speed adjustment step includes: if each of the first vibration amplitude, the second vibration amplitude, and the third vibration amplitude is greater than or equal to the predetermined threshold, changing the switching frequency of the frequency converter.

According to an embodiment of the present disclosure, the determination step includes: determining whether at least one of the first vibration amplitude, the second vibration amplitude, and the third vibration amplitude is greater than or equal to the predetermined threshold; and the speed adjustment step includes: if the at least one of the first vibration amplitude, the second vibration amplitude, and the third vibration amplitude is greater than or equal to the predetermined threshold, and the compressor is in a constant speed operation stage, changing the switching frequency of the frequency converter.

According to an embodiment of the present disclosure, the control method for the compressor further includes: determining whether the vibration amplitude of the compressor has decreased below the predetermined amplitude after changing the switching frequency of the frequency converter or/and modulating the frequency of the compressor; and if the vibration amplitude of the compressor has not decreased below the predetermined amplitude, giving an alarm and stopping the operation of the compressor.

According to an embodiment of the present disclosure, there is provided a compressor system, including: a compressor; a vibration sensor configured to detect a vibration amplitude of the compressor; a frequency converter configured to provide power to the compressor; and a controller configured to determine whether the vibration amplitude of the compressor is greater than or equal to a predetermined threshold, and to, if the detected vibration amplitude of the compressor is greater than or equal to the predetermined threshold, change a switching frequency of a frequency converter or/and modulate a frequency of the compressor.

According to an embodiment of the present disclosure, the compressor includes a shell having a lower part, and a refrigerant discharge pipe connected to the shell, and the vibration sensor is configured to detect the vibration amplitude of the lower part of the shell of the compressor in a horizontal direction and perpendicular to an axial direction of the refrigerant discharge pipe.

According to an embodiment of the present disclosure, the compressor includes a shell having a lower part, and a refrigerant discharge pipe connected to the shell; and the vibration sensor is configured to detect at least one of a first vibration amplitude in a first direction, a second vibration amplitude in a second direction, and a third vibration amplitude in a third direction of the lower part of the shell of the compressor; wherein the first direction is an axial direction of the refrigerant discharge pipe, the second direction is perpendicular to the first direction, and the third direction is perpendicular to the first and second directions.

According to an embodiment of the present disclosure, the refrigerant discharge pipe extends in the horizontal direction, and the first and second directions define a horizontal plane.

According to an embodiment of the present disclosure, the vibration sensor is provided at the lower part of the shell of the compressor.

According to an embodiment of the present disclosure, the controller is further configured to determine whether each of the first vibration amplitude, the second vibration amplitude, and the third vibration amplitude is greater than or equal to the predetermined threshold, and if the second vibration amplitude is greater than or equal to the predetermined threshold, and the first and third vibration amplitudes are less than a first threshold, modulate the frequency of the compressor by the frequency converter.

According to an embodiment of the present disclosure, the controller is further configured to determine whether at least one of the first vibration amplitude, the second vibration amplitude, and the third vibration amplitude is greater than or equal to the predetermined threshold, and to, if the at least one of the first vibration amplitude, the second vibration amplitude, and the third vibration amplitude is greater than or equal to the predetermined threshold, and the compressor is in an acceleration or deceleration stage, modulate the frequency of the compressor by the frequency converter.

According to an embodiment of the present disclosure, the controller is further configured to determine whether each of the first vibration amplitude, the second vibration amplitude, and the third vibration amplitude is greater than or equal to the predetermined threshold; and if each of the first vibration amplitude, the second vibration amplitude, and the third vibration amplitude is greater than or equal to the predetermined threshold, the switching frequency of the frequency converter is changed.

According to an embodiment of the present disclosure, the controller is further configured to determine whether at least one of the first vibration amplitude, the second vibration amplitude, and the third vibration amplitude is greater than or equal to the predetermined threshold; and to, if the at least one of the first vibration amplitude, the second vibration amplitude, and the third vibration amplitude is greater than or equal to the predetermined threshold, and the compressor is in a constant speed operation stage, change the switching frequency of the frequency converter.

According to an embodiment of the present disclosure, the controller is further configured to determine whether the vibration amplitude of the compressor has decreased below the predetermined amplitude after changing the switching frequency of the frequency converter or/and modulating the frequency of the compressor; and to, if the vibration amplitude of the compressor has not decreased below the predetermined amplitude, give an alarm and stop the operation of the compressor.

With the adoption of the control method for the compressor according to embodiments of the disclosure, for example, it is convenient to know whether the abnormal vibration of the compressor occurs, and the resonance frequency range of the compressor may be avoided and the service life of the compressor may be extended by changing a control parameter such as switching frequency of the frequency converter or modulating the frequency such as frequency hopping of the compressor.

DETAILED DESCRIPTION OF EMBODIMENTS

A scroll compressor according to embodiments of the present disclosure will be described hereinafter in accordance with the accompanying drawings.

Figure 1:
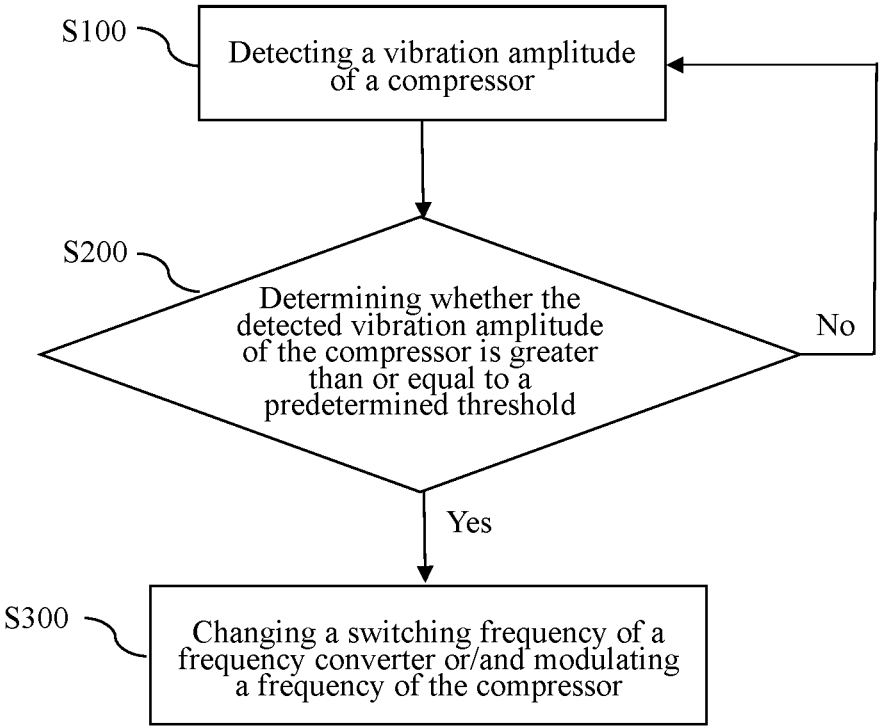
FIG. 1 is a flowchart of a control method for a compressor according to an embodiment of the present disclosure.

Referring to FIG. 1, a control method for a compressor according to an embodiment of the present disclosure includes: a detection step, a determination step, and a speed adjustment step. Specifically, in the detection step, i.e., step S100, a vibration amplitude of the compressor is detected; in the determination step, i.e., step S200, whether the detected vibration amplitude of the compressor is greater than or equal to a predetermined threshold is determining; and in the speed adjustment step, i.e., step S300, if the detected vibration amplitude of the compressor is greater than or equal to the predetermined threshold, a switching frequency of a frequency converter is changed or a frequency of the compressor is modulated.

According to an embodiment of the present disclosure, the compressor may be any suitable compressor such as scroll compressor, piston compressor, etc. The compressor may be used for refrigeration equipment, such as air conditioner, refrigerator, etc. The compressor may include: a shell having a lower part; and a refrigerant discharge pipe connected to the shell. The lower part of the shell of the compressor may be provided with a vibration sensor, which may be a contact or non-contact vibration sensor. The detection step may include: detecting the vibration amplitude of the lower part of the shell of the compressor in a horizontal direction and perpendicular to an axial direction of the refrigerant discharge pipe if both are projected onto one same horizontal surface. According to the embodiments of the present disclosure, the vibration amplitude of the lower part of the compressor in the horizontal direction and perpendicular to the axial direction of the discharge pipe is detected in real-time by setting the vibration sensor at the lower part of the compressor and transmitted to the frequency converter, and when the frequency converter detects the abnormal vibration of the compressor, it will give an alarm, perform a frequency hopping or modulate the switching frequency to quickly identify and suppress the abnormal vibration, that is, change a control parameter (such as a switching frequency) of a frequency converter or/and modulating a frequency of the compressor if the detected vibration amplitude of the compressor is greater than or equal to the predetermined threshold.

According to an embodiment of the present disclosure, the detection step may include: detecting at least one of a first vibration amplitude in a first direction, a second vibration amplitude in a second direction, and a third vibration amplitude in a third direction of the lower part of the shell of the compressor The first direction refers to a projection direction of the axial direction of the refrigerant discharge pipe, the second direction is perpendicular to the first direction, and the third direction is perpendicular to the first and second directions. For example, the refrigerant discharge pipe extends in the horizontal direction, the first and second directions define a horizontal plane, and the third direction is a direction vertical to the horizontal plane. During normal operation of the compressor, the vibration amplitudes of the compressor in the first, second, and third directions is relatively stable. Once resonance phenomenon or mechanical wear phenomenon occurs, the vibration amplitudes of the compressor in the first, second, and third directions will significantly increase. The resonance areas of the compressor in the first, second, and third directions are not exactly the same, with the vibration amplitude of the compressor in the second direction being the most obvious. The vibration amplitude of the compressor in the second direction is used as the main basis for determination of abnormal vibration, while the vibration amplitudes of the compressor in the first and third directions are used as an auxiliary basis for determination of abnormal vibration. Once the resonance occurs, the vibration amplitude in the second direction will undergo a sudden change, which makes it easier to determine the abnormal vibration.

According to an embodiment of the present disclosure, the determination step may include: determining whether each of the first vibration amplitude, the second vibration amplitude, and the third vibration amplitude is greater than or equal to the predetermined threshold, and the speed adjustment step includes: if the second vibration amplitude is greater than or equal to the predetermined threshold, and the first and third vibration amplitudes are less than a first threshold, modulating the frequency of the compressor by the frequency converter. For example, the frequency adjustment amplitude of the compressor is controlled between 5 Hz and 20 Hz, which may effectively avoid the resonance points of the compressor, especially the resonance points of the compressor provided with the refrigerant discharge pipe. As an option, the determination step may include: determining whether at least one of the first vibration amplitude, the second vibration amplitude, and the third vibration amplitude is greater than or equal to the predetermined threshold, and the speed adjustment step may include: if the at least one of the first vibration amplitude, the second vibration amplitude, and the third vibration amplitude is greater than or equal to the predetermined threshold, and if the compressor is in an acceleration or deceleration stage, modulating the frequency of the compressor by the frequency converter.

According to an embodiment of the present disclosure, the determination step may include: determining whether each of the first vibration amplitude, the second vibration amplitude, and the third vibration amplitude is greater than or equal to the predetermined threshold, and the speed adjustment step may include: if each of the first vibration amplitude, the second vibration amplitude and the third vibration amplitude is greater than or equal to the predetermined threshold, changing the switching frequency of the frequency converter, such as increasing/decreasing the switching frequency by 500 Hz or 1000 Hz. The reasonable selection of the switching frequency may effectively avoid the resonance point(s) of the compressor, especially the resonance point(s) of the compressor connected with the refrigerant discharge pipe. As an option, the determination step may include: determining whether at least one of the first vibration amplitude, the second vibration amplitude and the third vibration amplitude is greater than or equal to the predetermined threshold, and the speed adjustment step may include: if the at least one of the first vibration amplitude, the second vibration amplitude, and the third vibration amplitude is greater than or equal to the predetermined threshold and if the compressor is in a constant speed operation stage, changing the switching frequency of the frequency converter.

Figure 2:
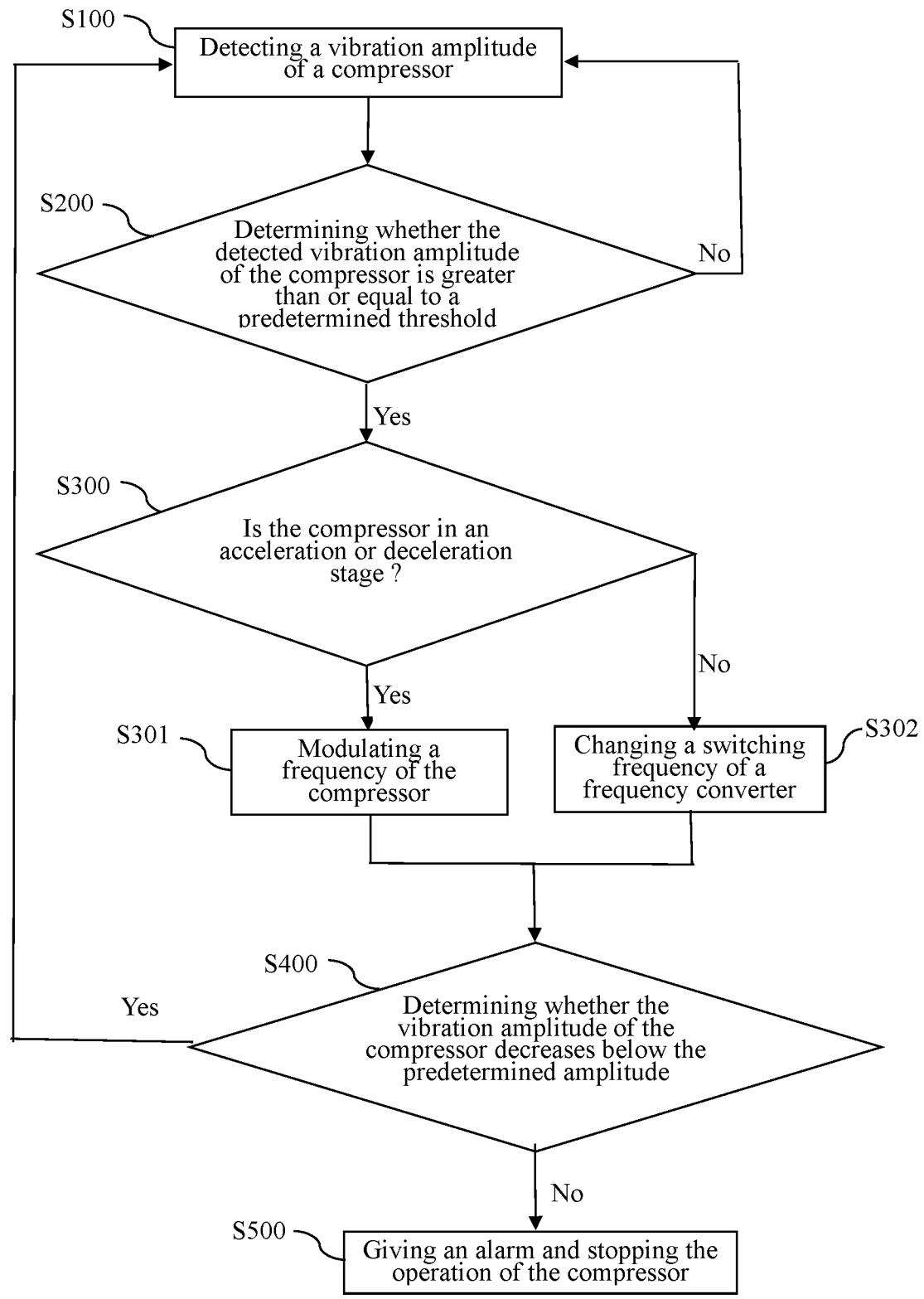
FIG. 2 is a flowchart of a control method for a compressor according to another embodiment of the present disclosure.

Referring to FIG. 2, a control method for a compressor according to an embodiment of the present disclosure includes: step S100: detecting a vibration amplitude of the compressor; step S200: determining whether the detected vibration amplitude of the compressor is greater than or equal to a predetermined threshold; step S300: if the detected vibration amplitude of the compressor is greater than or equal to the predetermined threshold, determining whether the compressor is in the acceleration or deceleration stage; step S301: if the compressor is in the acceleration or deceleration stage, modulating the frequency of the compressor; step S302: if the compressor is not in the acceleration or deceleration stage (such as in a stable or constant speed operation stage), changing the switching frequency of the frequency converter; step S400: determining whether the vibration amplitude of the compressor has decreased below the predetermined amplitude after changing the switching frequency of the frequency converter or modulating the frequency of the compressor; and step S500: if the vibration amplitude of the compressor has not decreased below the predetermined amplitude, giving an alarm and stopping the operation of the compressor. In addition, if the detected vibration amplitude of the compressor is less than the predetermined threshold, returning to step S100, and if the vibration amplitude of the compressor has decreased below the predetermined value, returning to step S100. In an embodiment, there may be a certain time interval T between issuing a command for changing the switching frequency of the frequency converter or modulating the frequency of the compressor and the next detection of the vibration amplitude of the compressor, to ensure the effective implementation of changing the switching frequency of the frequency converter or modulating the frequency of the compressor. For example, the time interval T may be calculated by taking the frequency adjustment amplitude configured inside the frequency converter and an inherent frequency rising or falling time of the frequency converter into account. In order to avoid alarm and shutdown caused by mis-judgment, one or more counter(s) that record adjustment of the frequency of the compressor or change of the switching frequency of the frequency converter may also be provided in the frequency converter. After a certain number n of times (e.g., n=3) for modulating the frequency of the compressor or for changing the switching frequency of the frequency converter, the alarm and shutdown may be triggered. The counter may either be a permanent storage type or a temporary storage type, and the value in the temporary storage type counter is cleared after trigger the alarm and shutdown. A memory may also be configured inside the frequency converter to record the value of each time for modulating the frequency of the compressor or changing the switching frequency of the frequency converter and the corresponding vibration amplitude of the compressor, and these records may be used for personnel on-site or online checking, and may also serve as the basis for the self-learning of the frequency converter, so as to achieve automatic and rapid avoidance in the future operation process, avoid repeated determination, and reduce the reaction time.

A compressor system 100 according to an embodiment of the present disclosure will be described hereinafter taken in conjunction with FIG. 3.

Figure 3:
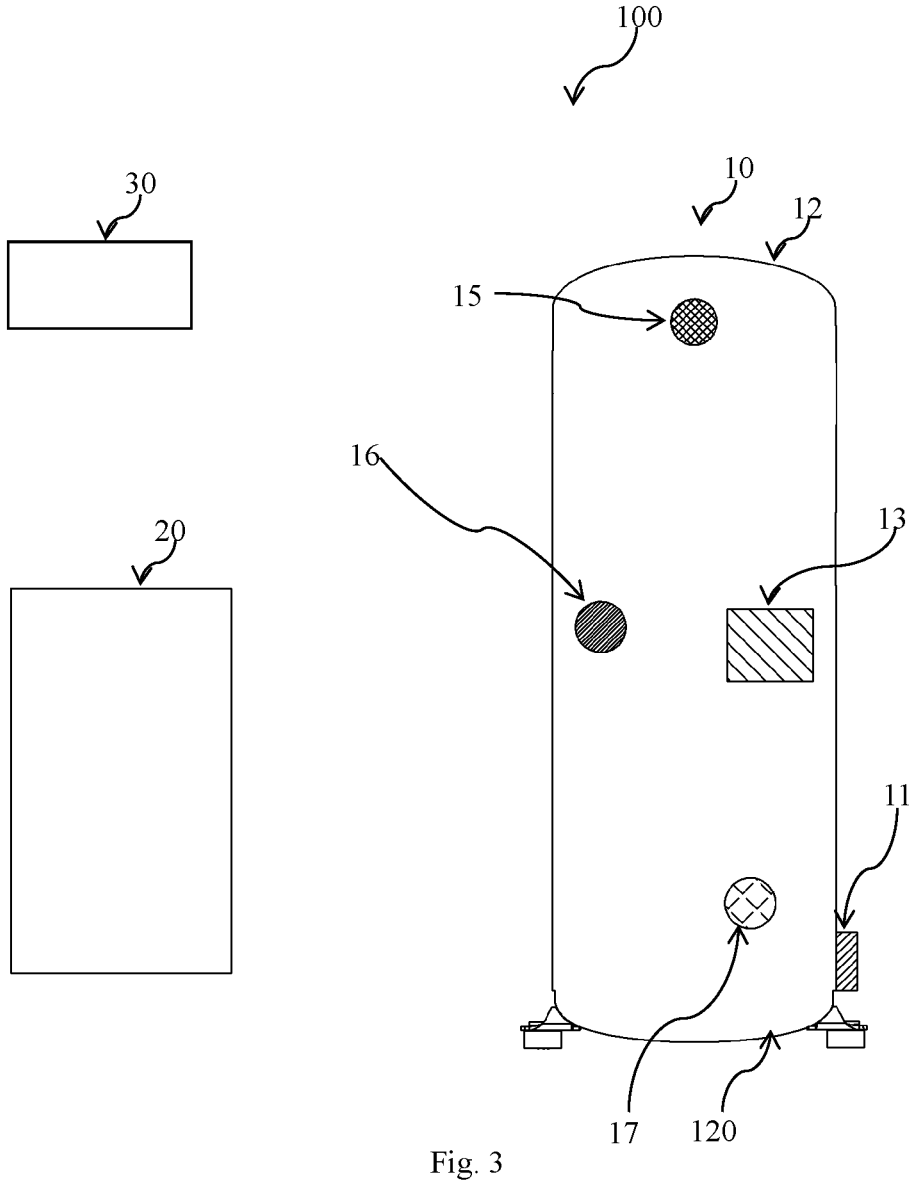
FIG. 3 is a schematic view of a compressor system according to an embodiment of the present disclosure.

As shown in FIG. 3, the compressor system 100 includes: a compressor 10, a vibration sensor 11, a controller 30, and a frequency converter 20. The vibration sensor 11 is configured to detect a vibration amplitude of the compressor 10, and the frequency converter 20 is configured to provide power to the compressor 10. The controller 30 is configured to determine whether the detected vibration amplitude of the compressor 10 is greater than or equal to a predetermined threshold; and to, if the detected vibration amplitude of the compressor 10 is greater than or equal to the predetermined threshold, change the switching frequency of the frequency converter 20 or/and modulate the frequency of the compressor 10. The compressor 10 includes: a shell 12 having a lower part 120; and a refrigerant discharge pipe 15 connected to the shell 12, the vibration sensor 11 being configured to detect the vibration amplitude of the lower part 120 of the shell 12 of the compressor 10 in a direction which is a horizontal and perpendicular to a horizontal projection of the axial direction of the refrigerant discharge pipe 15. The frequency converter 20 may be connected to the compressor 10 by a cable via a junction box 13 of the compressor 10 to provide power to the compressor 10. The vibration sensor 11, the controller 30, and the frequency converter 20 may be connected to each other by cables to transmit electrical signals. The compressor 10 further has a refrigerant suction pipe 16 and an oil sight glass 17. The vibration sensor 11 may be lower than the oil sight glass 17 of the compressor 10 in the vertical direction (the third direction) of the compressor 10. In order to facilitate wiring, an angle between the projections of the junction box 13 of the compressor and the vibration sensor 11 on the horizontal plane is not more than 120°. The controller 30 may be built into the frequency converter 20 as part of it. The vibration sensor 11 may be connected to a built-in data collection module of the frequency converter 20 by a signal line to collect vibration data.

According to an embodiment of the present disclosure, the vibration sensor 11 is configured to detect at least one of the first vibration amplitude in the first direction, the second vibration amplitude in the second direction, and the third vibration amplitude in the third direction of the lower part 120 of the shell 12 of the compressor 10. The first direction is the axial direction of the refrigerant discharge pipe 15, the second direction is perpendicular to the first direction, and the third direction is perpendicular to the first and second directions. The refrigerant discharge pipe 15 may extend in the horizontal direction, and the first and second directions define a horizontal plane. The vibration sensor 11 may be provided at the lower part 120 of the shell 12 of the compressor 10.

According to an embodiment of the present disclosure, the controller 30 is further configured to determine whether each of the first vibration amplitude, the second vibration amplitude and the third vibration amplitude is greater than or equal to the predetermined threshold; and to, if the second vibration amplitude is greater than or equal to the predetermined threshold, and the first and third vibration amplitudes are less than the first threshold, modulate the frequency of the compressor 10 by the frequency converter 20. According to another embodiment of the present disclosure, the controller 30 is further configured to determine whether at least one of the first vibration amplitude, the second vibration amplitude, and the third vibration amplitude is greater than or equal to the predetermined threshold; and to, if the at least one of the first vibration amplitude, the second vibration amplitude, and the third vibration amplitude is greater than or equal to the predetermined threshold, and the compressor 10 is in the acceleration or deceleration stage, modulate the frequency of the compressor 10 by the frequency converter 20. According to another embodiment of the present disclosure, the controller 30 is further configured to determine whether each of the first vibration amplitude, the second vibration amplitude, and the third vibration amplitude is greater than or equal to the predetermined threshold; and to, if each of the first vibration amplitude, the second vibration amplitude and the third vibration amplitude is greater than or equal to the predetermined threshold, change the switching frequency of the frequency converter 20. According to another embodiment of the present disclosure, the controller 30 is further configured to determine whether at least one of the first vibration amplitude, the second vibration amplitude and the third vibration amplitude is greater than or equal to the predetermined threshold; and to, if the at least one of the first vibration amplitude, the second vibration amplitude and the third vibration amplitude is greater than or equal to the predetermined threshold, and the compressor 10 is in a constant speed operation stage, change the switching frequency of the frequency converter 20.

According to an embodiment of the present disclosure, the controller 30 is further configured to determine whether the vibration amplitude of compressor 10 has decreased below the predetermined amplitude after changing the switching frequency of the frequency converter 20 or/and modulating the frequency of the compressor 10; and to, if the vibration amplitude of the compressor 10 has not decreased below the predetermined amplitude, give an alarm and stop the operation of compressor 10.

The resonance point(s) may change when the compressor is installed on different bases. In addition, when the compressor is worn out, it can be concluded by experiments that the vibration amplitudes of the compressor increase in the first, second, and third directions increase and are significantly higher than normal. When the abnormal vibration is detected, it may be suppressed by performing the frequency hopping or changing the switching frequency. And when resonance occurs in the acceleration or deceleration stage of the compressor, it may be suppressed by performing the frequency hopping, because the resonance point is only a small interval at this time and the compressor will not stay at the resonance point. The resonance may be quickly suppressed by performing the frequency hopping. However, when the compressor needs to work at one frequency point for a long time and the resonance occurs at this frequency point, it may be suppressed by changing the switching frequency. This ensures that the compressor may operate stably at the set point for a long time. When the compressor is severely mechanically worn out, both performing the frequency hopping and changing the switch frequency have little effect on the vibration suppression, then it is necessary to alarm and shut down immediately to avoid aggravating the wear.

With the adoption of the control method for the compressor and the compressor system according to embodiments of the present disclosure, it is convenient to know whether the abnormal vibration of the compressor occurs, and the resonance frequency range of the compressor may be avoided and the service life of the compressor may be extended by changing switching frequency of the frequency converter or modulating the frequency of the compressor.

What is claimed is:

1. A control method for a compressor, the control method comprising:
   a detection step of detecting a vibration amplitude of the compressor;
   a determination step of determining whether the detected vibration amplitude of the compressor is greater than or equal to a predetermined threshold; and
   a speed adjustment step of changing a switching frequency of a frequency converter or/and modulating a frequency of the compressor if the detected vibration amplitude of the compressor is greater than or equal to the predetermined threshold;
   wherein
   the compressor comprises:
   a shell having a lower part,
   a refrigerant discharge pipe connected to the shell;
   wherein the detection step comprises: detecting at least one of a first vibration amplitude in a first direction, a second vibration amplitude in a second direction, and a third vibration amplitude in a third direction of the lower part of the shell of the compressor;
   wherein the first direction is an axial direction of the refrigerant discharge pipe, the second direction is tangential to the first direction, and the third direction is perpendicular to the first and second directions.

2. The control method for the compressor according to claim 1, wherein
   the compressor comprises:
   a shell having a lower part, and
   a refrigerant discharge pipe connected to the shell;
   wherein the detection step comprises: detecting the vibration amplitude at the lower part of the shell of the compressor in a horizontal direction and tangential to an axial direction of the refrigerant discharge pipe.

3. The control method for the compressor according to claim 1, wherein
   the refrigerant discharge pipe extends in a horizontal direction, and the first and second directions defines a horizontal plane.

4. The control method for a compressor according to claim 1, wherein
   the lower part of the shell of the compressor is provided with a vibration sensor, wherein the vibration sensor is in a normal direction of the shell.

5. The control method for the compressor according to claim 3, wherein
   the determination step comprises: determining whether each of the first vibration amplitude, the second vibration amplitude, and the third vibration amplitude is greater than or equal to the predetermined threshold; and
   the speed adjustment step comprises: if the second vibration amplitude is greater than or equal to the predetermined threshold, and the first and third vibration amplitudes are less than a first threshold, modulating the frequency of the compressor by the frequency converter.

6. The control method for the compressor according to claim 3, wherein
   the determination step comprises: determining whether at least one of the first vibration amplitude, the second vibration amplitude and the third vibration amplitude is greater than or equal to the predetermined threshold; and
   the speed adjustment step comprises: if the at least one of the first vibration amplitude, the second vibration amplitude and the third vibration amplitude is greater than or equal to the predetermined threshold and if the compressor is in an acceleration or deceleration stage, modulating the frequency of the compressor by the frequency converter.

7. The control method for the compressor according to claim 3, wherein
   the determination step comprises: determining whether each of the first vibration amplitude, the second vibration amplitude, and the third vibration amplitude is greater than or equal to the predetermined threshold; and
   the speed adjustment step comprises: if each of the first vibration amplitude, the second vibration amplitude, and the third vibration amplitude is greater than or equal to the predetermined threshold, changing the switching frequency of the frequency converter.

8. The control method for a compressor according to claim 3, wherein
   the determination step comprises: determining whether at least one of the first vibration amplitude, the second vibration amplitude, and the third vibration amplitude is greater than or equal to the predetermined threshold; and
   the speed adjustment step comprises: if the at least one of the first vibration amplitude, the second vibration amplitude, and the third vibration amplitude is greater than or equal to the predetermined threshold, and if the compressor is in a constant speed operation stage, changing the switching frequency of the frequency converter.

9. The control method for the compressor according to claim 1, further comprising:
   determining whether the vibration amplitude of the compressor has decreased below the predetermined amplitude after changing the switching frequency of the frequency converter or/and modulating the frequency of the compressor; and giving an alarm and stopping the operation of the compressor if the vibration amplitude of the compressor does not decrease below the predetermined amplitude.

10. A compressor system, comprising:

a compressor;

a vibration sensor configured to detect a vibration amplitude of the compressor;

a frequency converter configured to provide power to the compressor; and a controller configured to determine whether the vibration amplitude of the compressor is greater than or equal to a predetermined threshold, and to modulate a frequency of the compressor or/and change a switching frequency of a frequency converter if the detected vibration amplitude of the compressor is greater than or equal to the predetermined threshold;

wherein the compressor comprises a shell having a lower part, and a refrigerant discharge pipe connected to the shell; and the vibration sensor is configured to detect at least one of a first vibration amplitude in a first direction, a second vibration amplitude in a second direction and a third vibration amplitude in a third direction of the lower part of the shell of the compressor;

wherein the first direction is an axial direction of the refrigerant discharge pipe, the second direction is tangential to the first direction, and the third direction is perpendicular to the first and second directions.

11. The compressor system according to claim 10, wherein the compressor comprises a shell having a lower part, and a refrigerant discharge pipe connected to the shell, and the vibration sensor is located at a normal direction of the shell and is configured to detect the vibration amplitude at the lower part of the shell of the compressor in a horizontal direction tangential to an axial direction of the refrigerant discharge pipe.

12. The compressor system according to claim 10, wherein the refrigerant discharge pipe extends in the horizontal direction, and the first and second directions define a horizontal plane.

13. The compressor system according to claim 10, wherein the vibration sensor is provided at the lower part of the shell of the compressor.

14. The compressor system according to claim 12, wherein the controller is further configured to determine whether each of the first vibration amplitude, the second vibration amplitude and the third vibration amplitude is greater than or equal to the predetermined threshold, and to modulate the frequency of the compressor by the frequency converter, if the second vibration amplitude is greater than or equal to the predetermined threshold and if the first and third vibration amplitudes are less than a first threshold.

15. The compressor system according to claim 12, wherein the controller is further configured to determine whether at least one of the first vibration amplitude, the second vibration amplitude, and the third vibration amplitude is greater than or equal to the predetermined threshold, and to, if the at least one of the first vibration amplitude, the second vibration amplitude, and the third vibration amplitude is greater than or equal to the predetermined threshold and if the compressor is in an acceleration or deceleration stage, modulate the frequency of the compressor by the frequency converter.

16. The compressor system according to claim 12, wherein the controller is further configured to determine whether each of the first vibration amplitude, the second vibration amplitude, and the third vibration amplitude is greater than or equal to the predetermined threshold; and to change the switching frequency of the frequency converter if each of the first vibration amplitude, the second vibration amplitude, and the third vibration amplitude is greater than or equal to the predetermined threshold.

17. The compressor system according to claim 12, wherein the controller is further configured to determine whether at least one of the first vibration amplitude, the second vibration amplitude, and the third vibration amplitude is greater than or equal to the predetermined threshold; and to change the switching frequency of the frequency converter, if the at least one of the first vibration amplitude, the second vibration amplitude, and the third vibration amplitude is greater than or equal to the predetermined threshold and if the compressor operates at a constant speed.

18. The compressor system according to claim 10, wherein the controller is further configured to determine whether the vibration amplitude of the compressor has decreased below the predetermined amplitude after changing the switching frequency of the frequency converter or/and modulating the frequency of the compressor; and to give an alarm and stop the compressor if the vibration amplitude of the compressor has not decreased below the predetermined amplitude.

19. A control method for a compressor, the control method comprising:

a detection step of detecting a vibration amplitude of the compressor;

a determination step of determining whether the detected vibration amplitude of the compressor is greater than or equal to a predetermined threshold; and a speed adjustment step of modulating frequency of the compressor and/or changing a control parameter of a frequency converter if the detected vibration amplitude of the compressor is greater than or equal to the predetermined threshold, wherein the compressor comprises:

a shell having a lower part, a refrigerant discharge pipe connected to the shell;

wherein the detection step comprises: detecting at least one of a first vibration amplitude in a first direction, a second vibration amplitude in a second direction, and a third vibration amplitude in a third direction of the lower part of the shell of the compressor;

wherein the first direction is an axial direction of the refrigerant discharge pipe, the second direction is tangential to the first direction, and the third direction is perpendicular to the first and second directions.

* * * * *